(12) United States Patent
Halliday et al.

(10) Patent No.: US 6,360,616 B1
(45) Date of Patent: Mar. 26, 2002

(54) AUTOMATED DIAGNOSIS AND MONITORING SYSTEM, EQUIPMENT, AND METHOD

(76) Inventors: Donald R. Halliday, 5312 Cascade Dr., Powell, OH (US) 43065; Donald W. Rice, 5820 Grubb Rd., Erie, PA (US) 16506

( * ) Notice: Subject to any disclaimer, the term of this patent is extended or adjusted under 35 U.S.C. 154(b) by 0 days.

(21) Appl. No.: 09/687,653

(22) Filed: Oct. 13, 2000

(51) Int. Cl.[7] ............................................. G01L 5/12
(52) U.S. Cl. ................................................. 73/862.49
(58) Field of Search .......................... 73/168, 862.49, 73/862.581, 862.583, 862.59

(56) References Cited

U.S. PATENT DOCUMENTS

| | | | |
|---|---|---|---|
| 3,763,700 A | * 10/1973 | MacDonald | 73/862.49 |
| 4,472,107 A | * 9/1984 | Chang et al. | 415/104 |
| 4,782,696 A | * 11/1988 | Suchoza et al. | 73/168 |
| 5,527,194 A | * 6/1996 | Strong et al. | 440/80 |
| 5,760,289 A | * 6/1998 | Skottegard | 73/1.08 |
| 6,199,425 B1 | * 3/2001 | Lee | 73/9 |

* cited by examiner

Primary Examiner—Max Noori
(74) Attorney, Agent, or Firm—Mueller and Smith, LPA

(57) ABSTRACT

The invention is a system for measuring the thrust (and, optionally, radial) loads placed on a support thrust bearing assembly that supports a rotating shaft in an apparatus. The system includes an apparatus housing and a load isolation member that supports the support thrust bearing. The load isolation member is not in contact with the apparatus housing. A force sensor is disposed between the apparatus housing and the load isolation member such that axial loads, and optionally radial loads, are permitted to be transmitted by the load isolation member from the support thrust bearing assembly and are measured continuously by the sensor. The corresponding method for measuring the axial load placed on a support thrust bearing assembly that supports a rotating shaft in an apparatus includes providing an apparatus housing and a load isolation member supporting the support thrust bearing. The load isolation member is disposed such that it is not in contact with the apparatus housing. A force sensor is disposed between the apparatus housing and the load isolation member. Axial loads placed on said support thrust bearing assembly are measured with said force sensor.

21 Claims, 4 Drawing Sheets

AUTOMATED DIAGNOSIS AND MONITORING SYSTEM, EQUIPMENT, AND METHOD

CROSS-REFERENCE TO RELATED APPLICATIONS

None

STATEMENT REGARDING FEDERALLY SPONSORED RESEARCH

Not applicable

BACKGROUND OF THE INVENTION

The present invention relates generally to the monitoring of rotating equipment (e.g., pumps, vertical motors, compressors, turbines, and the like) for minimizing operating failures and more particularly to a system that continuously monitors the thrust (i.e. axial, and optionally radial, in direction) force (and, optionally, operating temperature and/or vibration) applied to the thrust bearings of rotating equipment.

Within industrial equipment generally there exist many examples where notification of impending bearing failure in equipment can reduce the possibility of a catastrophic result such as, for example, fire, explosion, the release of poisonous gases or fluids, potential human injury, and/or loss of life. Generally, such catastrophic results can occur because, in centrifugal pump applications, thrust bearing failure, deterioration, or misapplication can cause failure of the mechanical seals allowing loss of fluid.

Within the petrochemical industry in particular, there is a requirement to measure the axial load magnitude and direction (and, optionally, radial load and magnitude) on, and enhance the measurement of operating temperature and vibration characteristics of, the bearings being utilized in pumps, and to allow this information to be used for bearing and pump design, lubrication selection, lubrication change intervals, and system optimization. There also is the requirement to accurately predict bearing replacement prior to complete bearing and/or mechanical seal failure.

The petrochemical industry requires (per API and/or ANSI specifications) that the bearings in use be of a specific type and size for given applications. These required bearings tend to be angular contact ball bearings (typically either single row angular contact bearings mounted back-to-back, face-to-face or in tandem with each other; or double row angular contact ball bearings). These bearings are of relatively large size and are intended to be used on large diameter shafts, because of the need to minimize shaft deflection, which is detrimental to mechanical seal performance and life. Because of the typically high operating speed (e.g., 3,600 rpm) and large diameter bearings, it can be equally catastrophic for the bearings to be under-loaded as well as over-loaded. Thus, the plant operators place a premium on being continuously aware of these loads, temperatures, and vibrations during the bearings' operation. The historical accumulation of this data will assist in future bearing selection, lubrication selection (and for the calculation of how long the lubrication will last until it breaks down and becomes ineffective), system design (e.g., impeller design, piping layouts, etc.), system optimization, shaft alignment verification, and planned maintenance cycles.

Presently, bearing failure in industry can be anticipated to some degree by using temperature and/or vibration sensing of the mechanical environment adjacent to the bearings. Both of these methods of preventing bearing failure have an inherent problem and are of only limited value, i.e., these methods provide no force measurement, no automated feedback, no automated application assistance, and typically are not continuously monitored, etc.). Currently, the bearings sit in an environment in which they are not mechanically isolated from the bearing housing. This allows bearing vibration effects to be absorbed (i.e., changed and/or masked) by the mass of the bearing housing and support structure. For a period of time, the mass of the housing, being significantly larger and with more surface area than the bearings, absorbs, dissipates, and, therefore, masks the heat generated by improperly operating bearings. This bearing housing affect shortens the window of time in which a control system and/or operator can react to the change in the bearing performance and avoid a failure. An uncontrolled bearing failure has ramifications that include high repair cost (because of multiple component interactions), production loss, liability, and human/environmental exposure. In many industrial environments, e.g., a petrochemical plant, equipment and production losses can be high, not to mention worker safety put at risk and the potential for environmental damage.

Heretofore, U.S. Pat. No. 5,503,030 proposes a load sensing bearing comprised of a load measurement in roller bearings that is carried out by sensors arranged to measure forces applied to the bearing, and which communicates with the circuitry for recording, processing, and evaluating the signals from the sensors. U.S. Pat. No. 5,796,349 proposes a system and method for monitoring wear of an axial bearing comprised of a centrifugal pump, wherein if a drive motor is provided with an energy monitoring circuit, then an operator can detect the change in the load. U.S. Pat. No. 5,846,056 proposes a reciprocating pump system and method for operating the same, comprised of a control circuit that continually determines the average cylinder pressure and estimates the pump life. U.S. Pat. No. 4,584,865 proposes a device and method for testing a motor bearing wear, where the displacement of a rotating element causes wear of the coating which reduces its thickness and decreases resistance between the sensing elements through which the coating is measured.

Despite these proposals, there still exists a strong need in industry to be able to continuously monitor applied forces, especially axial thrust, of rotating equipment and to have an enhanced means of measuring temperature and vibration. It is to such need that the present invention is addressed.

BRIEF SUMMARY OF THE INVENTION

The invention is a system for measuring the thrust, and optionally radial, loads placed on a support thrust bearing assembly that supports a rotating shaft in an apparatus. The system includes an apparatus housing and a load isolation member that supports the support thrust bearing. The load isolation member is not directly in contact with the apparatus housing. A force sensor is disposed between the apparatus housing and the load isolation member such that axial (and, optionally, radial) loads are permitted to be transmitted by the load isolation member from the support thrust bearing assembly and are measured by the sensor.

One embodiment of the inventive system includes an apparatus housing and a load isolation member that supports the support thrust bearing. The load isolation member is not in contact with the apparatus housing. A linear bearing assembly is disposed between the load isolation member and the apparatus housing. A force sensor is disposed between the apparatus housing and the load isolation member such that axial loads are permitted to be transmitted by the load isolation member from the support thrust bearing assembly and are measured by the sensor.

The corresponding method for measuring the axial (and, optionally, radial) load placed on a support thrust bearing assembly that supports a rotating shaft in an apparatus includes providing an apparatus housing and a load isolation member supporting the support thrust bearing. The load isolation member is disposed such that it is not in contact with the apparatus housing. A force sensor is disposed between the apparatus housing and the load isolation member. Axial (and, optionally, radial) loads placed on said support thrust bearing assembly are measured with said force sensor.

BRIEF DESCRIPTION OF THE DRAWINGS

For a fuller understanding of the nature and advantages of the present invention, reference should be made to the following detailed description taken in conjunction with the accompanying drawings, in which.

Figure 1:
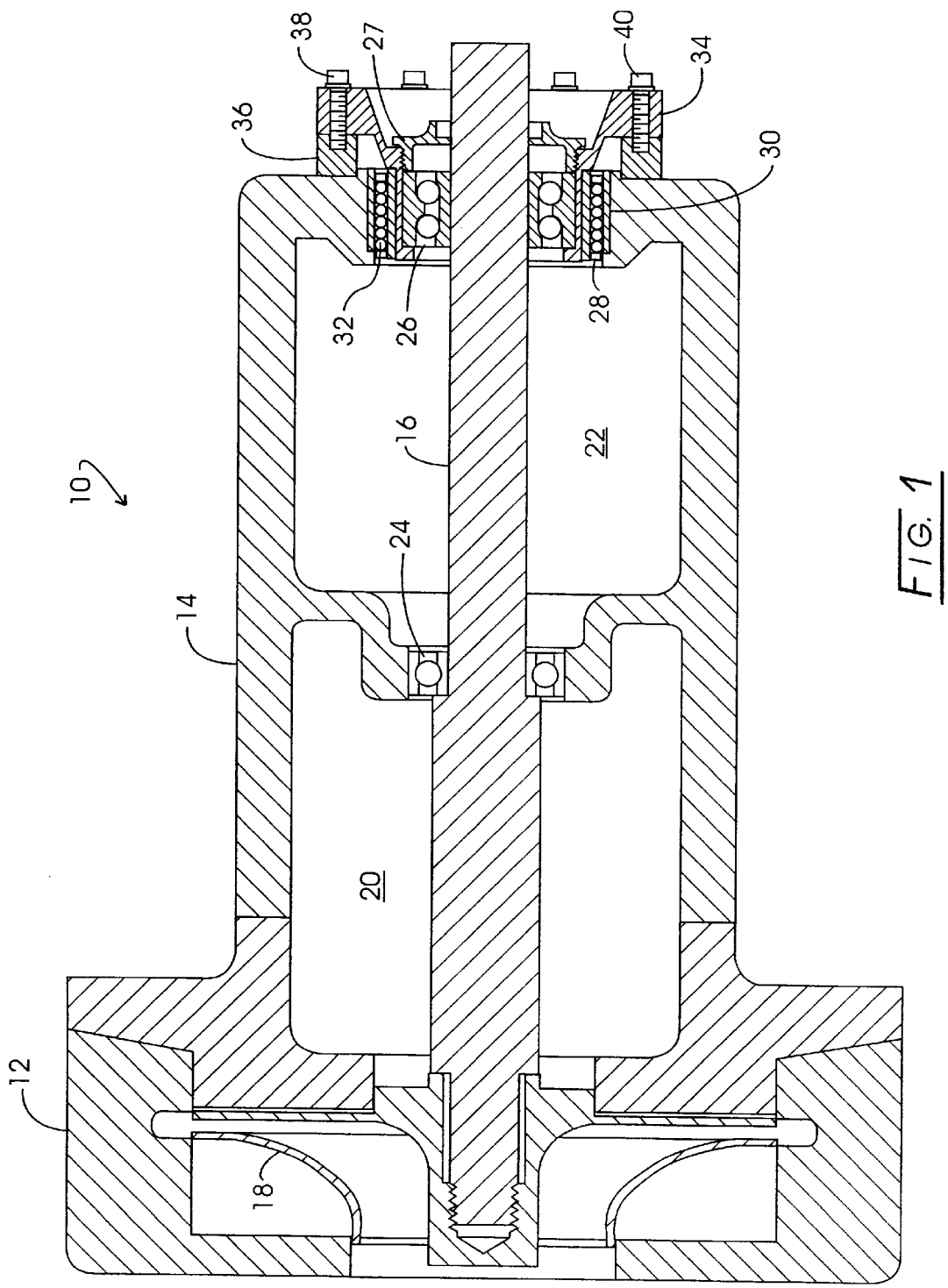
FIG. 1 is a cross-sectional view of a pump fitted with the inventive axial load measurement system.

The drawings will be described in detail below.

DETAILED DESCRIPTION OF THE INVENTION

The present invention, then, is directed to a unique system that continuously monitors the applied forces (i.e. axial, or axial and radial, in direction), operating temperature, and generated vibration of the thrust bearings of rotating equipment. The three dynamically sensed values of applied thrust force (magnitude and direction), vibration, and temperature are monitored continuously such that the user (or automated system) can watch (or monitor) for excessive or unexpected values, trends, and deviations from normal operating parameters. The user (or automated system) then can immediately react as needed to operational changes in both the thrust bearings and the system in which they are applied; for example, if a centrifugal pump were to experience cavitation. Measuring thrust load, bearing temperature, and vibration directly also provides a significantly quicker awareness of bearing deterioration or operating difficulty (e.g. overload, misalignment, bearing thermal runaway, underload and skidding balls, pump operation in cavitation, etc.).

In a bearing assembly where the bearing is designed to take a thrust load, the thrust bearing is normally slipped or pressed into a bearing housing within the parameters of the pump, motor, or other assembly that includes a rotating device, e.g., shaft. Because of the mechanical proximity of the assembly housing (often line-to-line or slightly loose by a few thousandths of an inch), the thrust load acting on the bearing is unable to be measured practically. Thrust bearings are restrained physically by a locknut on the shaft and by a shoulder on one side of the housing and an end plate on the other end.

In accordance with the precepts of the present invention, thrust load within a bearing assembly can be measured practically by at least the following three methods.

1. The first method is adapted for a rotating shaft that is supported radially by a bearing system that takes (reacts to) only radial load and no thrust load (two needle roller bearings, for example). This bearing system enables the shaft of the apparatus to move axially without imparting any axial load to these radial load-carrying bearings. With such a system, an additional (axial) thrust load carrying bearing in its own bearing carrier (isolation member) is introduced into the apparatus. The thrust load, thus, is measured between the bearing carrier or isolation member supporting this isolation thrust bearing and the apparatus main body housing.

2. In the second method, an isolation member and linear bearing assembly isolates the thrust load carrying bearing and radial load carrying bearings from the apparatus housing. This isolation in an axial direction then allows the force to be measured between the bearing carrier and the main body housing.

3. The third method can measure both the radial and thrust loads by supporting the bearing carrier by at least one load measuring system which has independently the ability to measure radial and thrust loads that the bearing carrier experiences.

In order to illustrate these different techniques, reference is made to the drawings.

Referring initially to FIG. 1, pump 10 is seen to include pump housing 12, bearing housing 14, and drive shaft 16 threadedly fitted to impeller 18. Cavity 20 accommodates packing/mechanical seals for shaft 16, while cavity 22 is an oil reservoir. Oil in cavity 22 may be pumped by an oil pump (not shown in the drawings) driven also by shaft 16. Slinger rings, wet sump, or air-oil mist are three of the most common lubrication methods. Deep groove ball bearing assembly 24 disposed between cavities 20 and 22 in bearing housing 14 is slip fitted into housing 14 to allow for shaft and bearing assembly, and to permit axial growth during use. Angular contact bearing assembly 26 locates impeller 18 through shaft 16 and is designed to take all of the axial load from the drive shaft/impeller assembly. End cap/seal holder spacers 27 are used to positively retain angular contact bearing assembly 26 into its bearing carrier.

In order to measure/monitor the axial (and, optionally, radial) loads generated by impeller 18, ball cage 28 having hardened race 30 and bearing carrier 34 retain ball bearings, as represented by ball bearing 32 therein. Bearing housing 14 carries race 30. Bearing carrier 34 is threadedly connected to end cap/seal holder spacers 27 and retains load cell 36 via threaded members, as represented by threaded members 38 and 40 in FIG. 1. Ball bearings in ball cage 28 permit axial forces to be transmitted through carrier 34 to load cell 36. That is, hardened race 30 does not move as housing 14 carries race 30. Thus, axial loads transmitted by shaft 16 will be transferred to bearing carrier 34 and bearing carrier 34 will be permitted to be displaced by the linear ball bearings between hardened race 30 and bearing carrier 34. It will be seen that bearing carrier 34 also serves as a load isolation member in that measured axial forces are transmitted through bearing carrier 34 independent of bearing housing 14. Measurement of axial load forces on impeller 18 further are isolated from angular contact ball bearing assembly 26 by the disclosed construction.

It should be understood that the variable axial and radial loads imposed on angular contact bearing assembly 26 by pump impeller 18 have a detrimental effect on bearing performance and life predictability. As it is, the pump parameters (e.g., inlet and outlet pressures, impeller design, fluid viscosity, etc.) are variable and can cause bearing forces to be pushing from the impeller to the bearing or the reverse. Due to this variability, bearing life is indeterminate, and bearings, which should last in excess of 3 years (i.e., 90% survival after 3 years with 15 years on average) according to nominal loads determined by the pump manufacturer and bearing selected, typically are changed out at 1½ to 3 year intervals.

System failure (i.e., mechanical seals, bearings, shaft seals, and lubrication) usually is due to a series of dynamic interactions between these components. For example, mechanical seal performance can be greatly affected by the bearings operation. Bearing performance problems and service life problems generally are not caused by excessive load, but usually are due to deterioration of the lightly loaded ball race(s). This side of the bearing can have a different load angle to accommodate lower loads, but must be designed to carry the maximum predicted loads. The problem to be solved is to know the bearing loads that will be encountered in use and select the appropriate bearing and how the resultant bearing operation will affect the mechanical seal life and performance.

One use of the inventive system is to use the measured axial loads to drive the pump inlet and exhaust pressures, which could keep the bearing loaded appropriately (if not optimally). Another use would be to actively vary the bearing installation load (i.e., pre-load clamp load on the bearing pair) to keep the loads within the bearing parameters and to ensure that both rows of balls are in contact with the race to prevent this failure. Another use is an application guide for the selection of bearing type and size.

Figure 2:
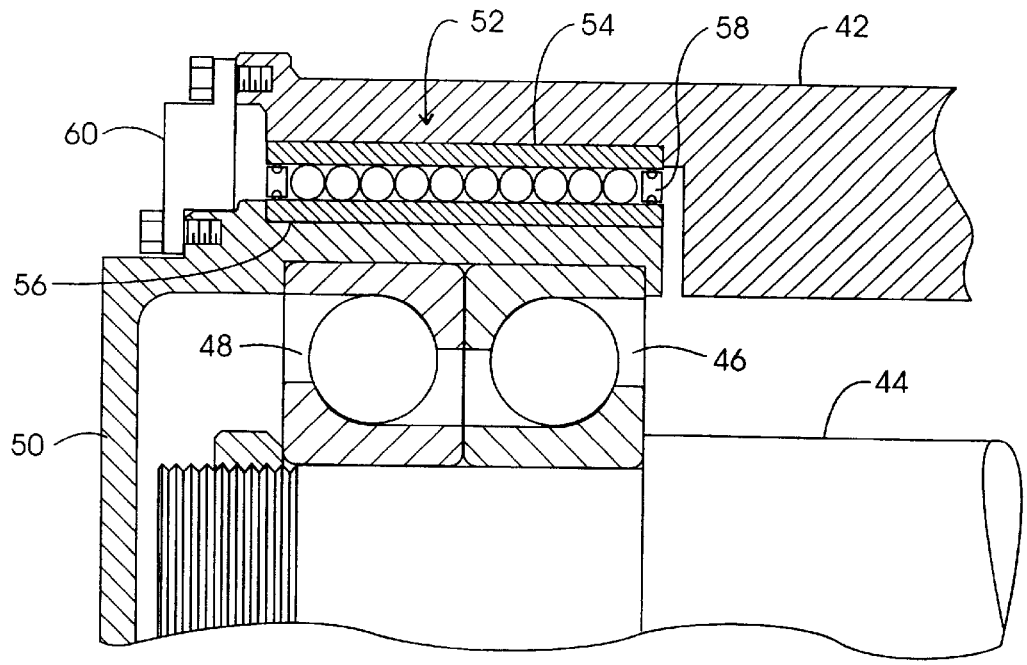
FIG. 2 is an enlarged cross-sectional view of the axial load measurement system depicted in FIG. 1.

FIG. 2 is an enlarged view of a bearing arrangement similar to that depicted in FIG. 1. Housing 42 and shaft 44 are partially shown along with back-to-back angular contact bearings 46 and 48. Bearing carrier (load isolation member) 50 retains linear bearing assembly 52, which is comprised of hardened races 54/56 and ball cage 58 that retain a series of ball bearings. Housing 42 carries hardened race 54 while bearing carrier 50 carries hardened race 56. Mounted between member 50 and housing 42 is load cell 60. By this arrangement, axial load forces from shaft 44 act on bearing carrier 50, which is load isolated axially from housing 42 by linear bearing assembly 52. That is, the ball bearings in assembly 52 permit axial forces to move bearing carrier 50 while hardened race 54 remains static due to its attachment to housing 42. That axial force is measured by load cell 60, which is in electrical connection with a read-out device, PC, or other assembly for transmitting the axial load forces to a user or computer. It will be understood that the arrangement in FIG. 2 is similar to that depicted in FIG. 1.

Figure 3:
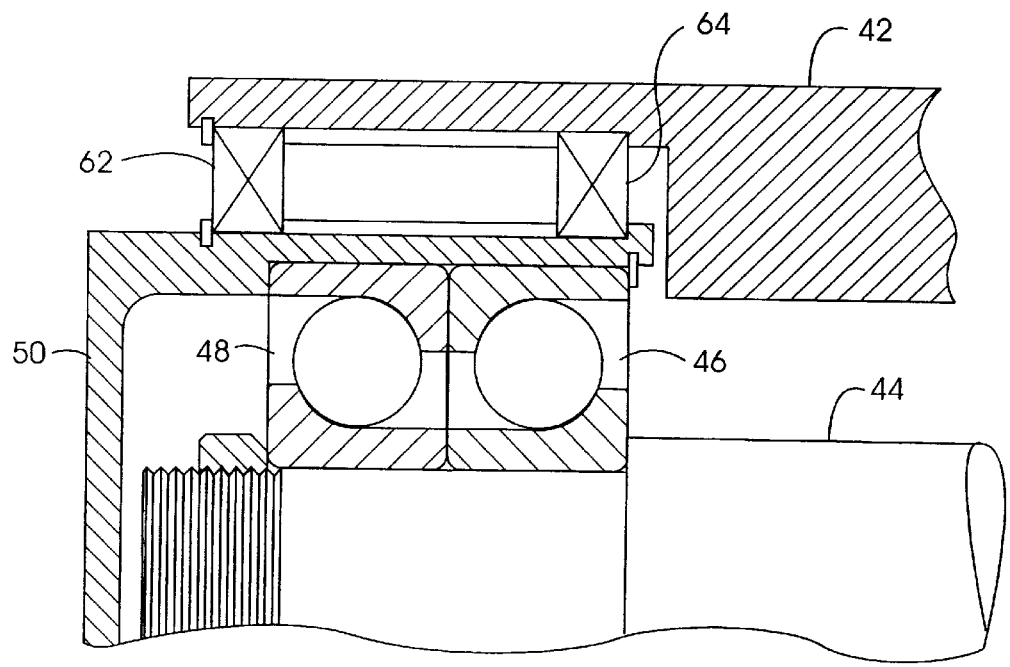
FIG. 3 is an enlarged cross-sectional view of another axial load, and optionally radial, measurement system embodiment, which also permits radial load to be measured.

Depicted in FIG. 3 is a bearing arrangement that permits measurement of both axial and radial load forces. Again, housing 42 and shaft 44 are shown along with angular contact bearing set 46 and 48. Bearing carrier 50 is seen along with housing 42 to sandwich load cells 62 and 64 therebetween. These load cells can measure both thrust (axial) as well as radial loads transmitted through bearing carrier 50 and act similarly to bearing assembly 52 in FIG. 2 in that load cells 62 and 64 can accommodate axial forces along shaft 44 isolated from bearing set 46 and 48. It should be recognized that a single load cell or sensor of proper design and installation could be used in place of the load cells 62 and 64 shown in FIG. 3. For that matter more than 2 load cells also could be used. Thus, the manufacturer has latitude in the selection, design, and location of the force sensors to be used in accordance with the precepts of the present invention. It should be observed that both axial and radial load forces could be measured if a radial load sensor is placed between housing 42 and hardened race 54 in FIG. 3.

Figure 4:
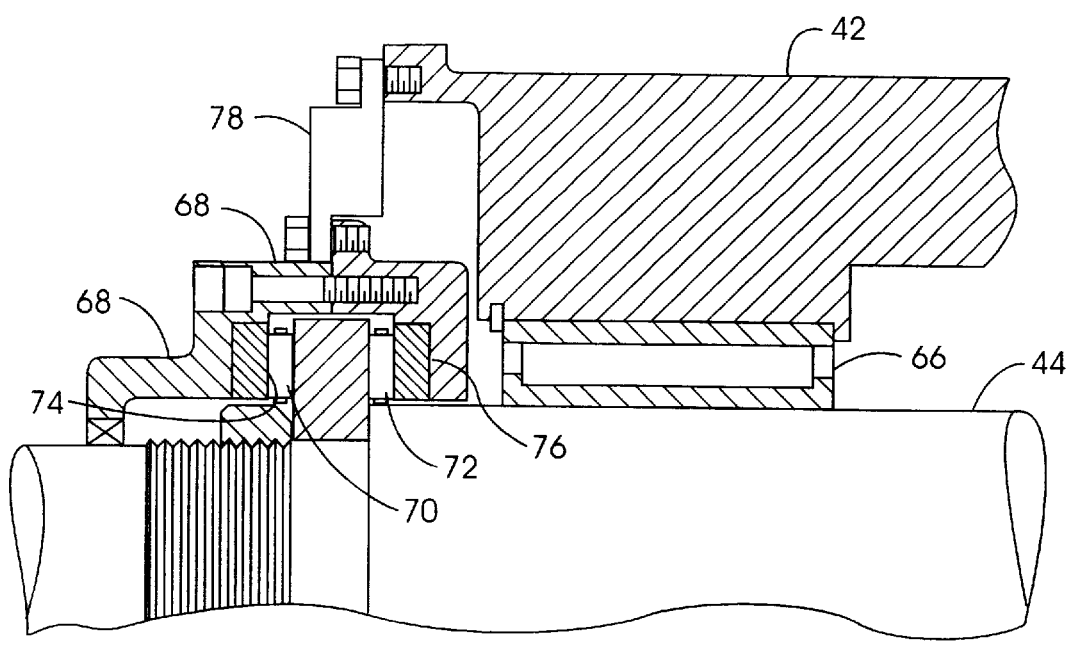
FIG. 4 an enlarged cross-sectional view of yet another axial load measurement system embodiment.

In FIG. 4, housing 42 and shaft 44 are seen in a different configuration. That is, radial-bearing assembly 66 (needle roller bearing) is seen to be used in conventional fashion. The invention employs bearing carrier 68 (load isolation member), which retains thrust bearings 70/72, which in turn are disposed between hardened races 74/76. Connected between bearing carrier 68 and housing 42 is load cell 78. Again, however, this arrangement also enables axial forces transmitted by shaft 44 to be measured by an arrangement that isolates the measured load from the main bearing assembly for shaft 44.

Regardless of the configuration, by interposing a separate monitored bearing assembly (separate from the main bearing assembly for the rotating shaft) and isolating such monitored bearing assembly from the main housing structure, axial load can be determined in a highly expeditious manner. The load isolating housing is small in size and mass relative to the main apparatus housing and is directly connected to the measured thrust bearing assembly. A vibration sensor and temperature sensor device can be fastened to the thrust bearing housing. Thus, any undesirable temperature increase and/or vibration from the thrust bearing is directly transferred to the load isolating housing from the monitored bearing and subsequently monitored by the temperature and vibration sensors.

Broadly, the inventive system and equipment can be used to monitor and diagnose machines in accordance with the following procedure:

Step 1: Establish a baseline signature for the bearings (e.g., forces, and temperature and vibration levels).

Step 2: Quick check for anything abnormal (e.g., initial operating temperature is not stabilizing or bearing vibrations are excessive with respect to other similar bearings or forces deviate significantly from what is expected).

Step 3: Compare continuous readings to baseline.

Step 4: Print routine reports as needed.

Figure 5:
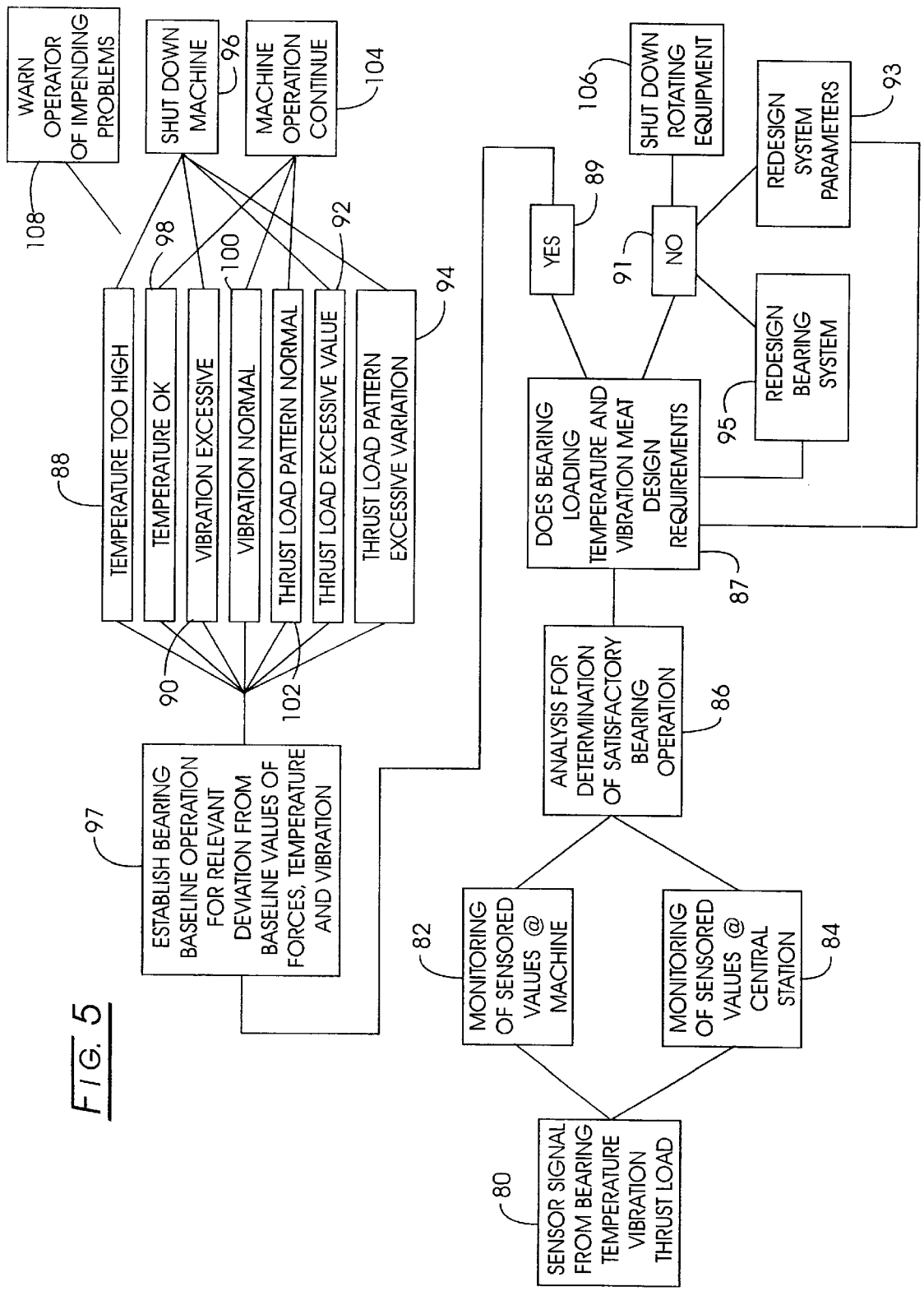
FIG. 5 is a logic diagram showing how a machine could be diagnosed and monitored using the inventive axial, and optionally radial, load, temperature, and vibration measurement system.

FIG. 5 depicts a logic diagram showing such procedure using the inventive axial load and radial/axial load isolation measurement system. In particular, the sensor signal from the bearing temperature, vibration, and thrust load in box 80 can either be treated on a single machine basis in box 82 or can be sent to a central station along with additional machine signals in box 84. Whether on a single machine basis or on a factory-wide basis, the signals from box 80 must be analyzed in box 86 to determine whether bearing is satisfactory in operation. Such analysis would include whether the bearing loading, temperature, and vibration characteristics meet the design requirements in box 87. If the design requirements are "no", as in box 91, the system parameters in box 93 or bearing system in box 95 may need to be redesigned and analysis in box 87 re-determined. Alternatively, the rotating equipment may need to be shut down as called for in box 106. Once design criteria have been met in box 89, a baseline of operation for the system and bearings is established and recorded in box 97.

Thereafter, the system is monitored to determine relevant deviations from baseline values of forces, temperature, and vibration, inter alia, whether the monitored bearing temperature was too high, as in box 88; whether the monitored vibration was excessive, as in box 90; whether the monitored forces were significantly different from what was expected, as in box 92; or whether the monitored thrust load pattern displayed an excessive variation, as in box 94. In all of these cases, the machine would be shut down, as in box 96. Alternatively and/or in addition to shutting down the machine, a warning could be issued to the operator of the problems being detected, as in box 108. Such warning could include, inter alia, a audible alarm, a visual alarm, both an audible and visible alarm, or the like. Indeed, other equipment in the process dependent upon the rotating equipment being monitored may require lead time in order to shut down and/or in order to be diverted to stand-by equipment and/or processing should a failure occur.

Such analysis also could include, inter alia, whether the monitored temperature was okay, as in box 98; whether the monitored vibration was normal, as in box 100; and whether the monitored thrust load pattern was normal, as in box 102. In all of these cases, machine operation would be permitted to continue, as in box 104.

While the invention has been described and illustrated in connection with certain preferred embodiments thereof, it will be apparent to those skilled in the art that the invention is not limited thereto. Accordingly, it is intended that the appended claims cover all modifications, which are within the spirit and scope of this invention. All references cited herein are expressly incorporated herein by reference.

What is claimed is:

1. A system for measuring the thrust load placed on a support thrust bearing assembly that supports a rotating shaft in an apparatus, which comprises:
   (a) an apparatus housing;
   (b) a load isolation member supporting said support thrust bearing and not in direct contact with said apparatus housing;
   (c) a force sensor disposed between said apparatus housing and said load isolation member such that axial loads are permitted to be transmitted by said load isolation member from said support thrust bearing assembly and are measured by said sensor.

2. The system of claim 1, wherein an axial load sensor and a radial load sensor are disposed between said isolation member and said apparatus housing for measuring the axial load and the radial load on said rotating shaft.

3. The system of claim 1, wherein one or more of a temperature sensor or a vibration sensor is in sensing contact with said load isolation member.

4. The system of claim 1, wherein said support thrust bearing assembly comprises a radial bearing and a separate axial thrust bearing, wherein said load isolation member supports only said axial thrust bearing.

5. The system of claim 1, wherein a linear bearing assembly also is disposed between said apparatus housing and said load isolation member.

6. The system of claim 1, wherein said apparatus is one or more of a single stage pump, a multi-stage pump, a turbine, a compressor, or an electric motor.

7. A method for measuring the axial load placed on a support thrust bearing assembly that supports a rotating shaft in an apparatus, which comprises the steps of:
   (a) providing an apparatus housing;
   (b) providing a load isolation member supporting said support thrust bearing and not in direct contact with said apparatus housing;
   (c) providing a force sensor disposed between said apparatus housing and said load isolation member; and
   (d) measuring with said force sensor axial loads placed on said support thrust bearing assembly.

8. The method of claim 7, wherein an axial load sensor and a radial load sensor are disposed between said isolation member and said apparatus housing for measuring the axial load and the radial load on said support thrust bearing assembly.

9. The method of claim 7, wherein one or more of a temperature sensor or a vibration sensor is placed in sensing contact with said load isolation member.

10. The method of claim 7, wherein said support thrust bearing assembly is provided as a radial bearing and a separate axial thrust bearing, wherein said load isolation member supports only said axial thrust bearing.

11. The method of claim 7, wherein a linear bearing assembly also is disposed between said apparatus housing and said load isolation member.

12. The method of claim 7, wherein said apparatus is provided as one or more of a single stage pump, a multi-stage pump, a turbine, a compressor, or an electric motor.

13. The method of claim 7, wherein said measuring step (d) is conducted intermittently.

14. The method of claim 7, wherein said measuring step (d) is conducted continuously.

15. The method of claim 7, which further comprises the steps of:
   (e) determining whether the measured axial loads in step (d) meet design requirements.

16. The method of claim 15, which further comprises:
   (f) if the determination in step (e) is that bearing operation meets design requirements, establish a bearing baseline;
   (g) compare the measured axial loads in step (d) with said established baseline in step (f) in order to determine deviation;
   (h) if the deviation in step (g) is relevant, then issue a warning or shut the assembly down.

17. The method of claim 9, which further comprises:
   (i) determining whether the measured one or more of axial load, temperature, or vibration meets design requirements.

18. The method of claim 17, which further comprises:
   (j) if the determination in step (i) is that operation meets design requirements, establish a baseline for one or more of axial load, temperature, or vibration;
   (k) compare the measured one or more of axial load, temperature, or vibration in step (j) with said established baseline in step (j) in order to determine deviation;
   (l) if the deviation in step (k) is relevant, then issue a warning or shut the assembly down.

19. A system for measuring the thrust load placed on a support angular contact bearing assembly that supports a rotating shaft in an apparatus, which comprises:
   (a) an apparatus housing;
   (b) a load isolation member supporting said support thrust bearing and not in contact with said apparatus housing;
   (c) a linear bearing assembly disposed between said load isolation member and said apparatus housing;
   (d) a force sensor disposed between said apparatus housing and said load isolation member such that axial loads are permitted to be transmitted by said load isolation member from said support thrust bearing assembly and are measured by said sensor.

20. The system of claim 19, wherein one or more of a temperature sensor or a vibration sensor is in sensing contact with said load isolation member.

21. The system of claim 19, wherein said apparatus is one or more of a single stage pump, a multi-stage pump, a turbine, a compressor, or an electric motor.

* * * * *